Patented Oct. 6, 1936

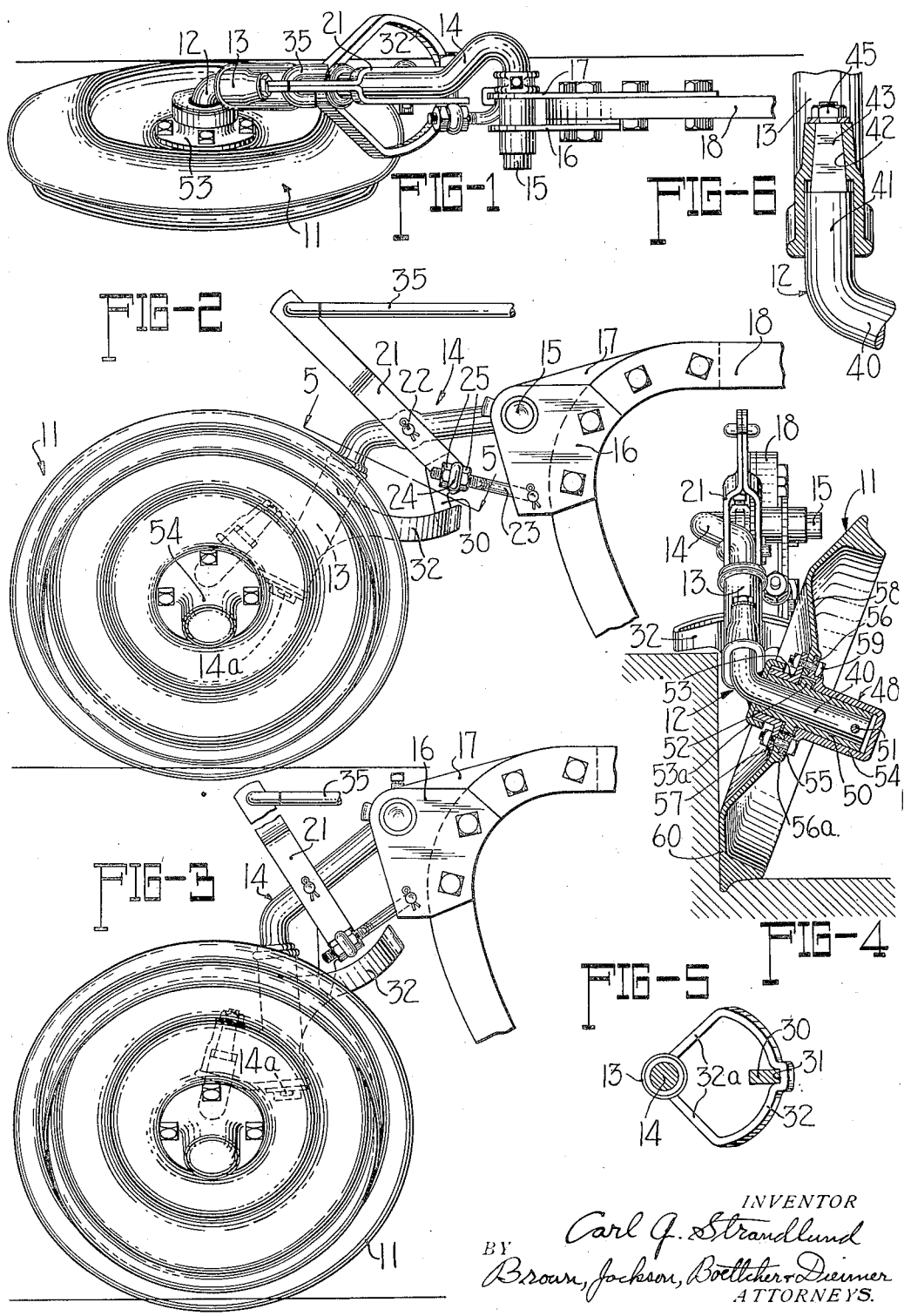

2,056,374

UNITED STATES PATENT OFFICE 2,056,374

PLOW

Carl G. Strandlund, Moline, Ill., assignor to Deere & Company, Moline, Ill., a corporation of Illinois Application February 26, 1934, Serial No. 712,879

25 Claims. (Cl. 97—127)

The present invention relates to plows, and has more particularly to do with the structures of the rear furrow wheels thereof and the means associated therewith for raising and lowering the plow.

As is well known to those skilled in the art, implements of the type ordinarily known as riding plows or tractor plows are usually provided with a rear furrow wheel pivotally connected to the frame structure for vertical swinging movement, and such furrow wheel, when the plow is in operating position, runs in the furrow behind the plow body in a one bottom plow or behind the rear plow body in a structure having two or more plow bottoms. This furrow wheel is adapted to be swung downwardly relatively to the plow structure on its pivotal connection therewith for raising the plow body or bodies to transport or inoperative position, and to be swung upwardly on such pivotal connection to lower the plow body or bodies to working or operating position, the power for swinging the furrow wheel on its pivot being derived from the main crank axle of the plow, as is usual in such constructions.

In many of the prior devices with which I am familiar such rear furrow wheels have been so constructed and mounted on the plow beam that the support therefor does not always clear the furrow wall, with the result that the furrow wheel support, which is in advance of the furrow wheel, tends to destroy the upper edge of the furrow wall. Also, the soil falling down into the bottom of the furrow gives the furrow wheel an uneven surface upon which to ride and, as a result, causes the plow to be lifted occasionally in riding over clods of soil. Thus, not only has unnecessary draft been added to the load, but uneven plowing has resulted, which, of course, is objectionable.

With the above noted objection in view it is the principal object of the present invention to provide means so constructed and arranged as to dispose the wheel support sufficiently furrow-ward away from the wall of the furrow so that it will not break down the upper edge of the furrow wall.

Another object of the present invention is to provide means for detachably connecting the axle of the furrow wheel with its support whereby the axle may be readily replaced when it becomes worn through use.

A further object of the invention is to provide a removable bearing sleeve between the axle and the hub of the furrow wheel for taking the wear between the axle and the hub, and which may be readily replaced when necessary.

A still further object of the invention is to provide improved means carried by the wheel support and cooperating with the plow raising means whereby, when the plow is raised to transport position, said wheel support and the furrow wheel carried thereby will have limited castering movement to a certain extent, and when the plow is in operating position will be locked against such castering movement.

Other objects and advantageous features will be apparent from the following description of the preferred embodiment of the invention taken in connection with the accompanying drawing, in which:

Figure 1 is a top plan view of the rear portion of the plow beam of a plow constructed according to the principles of the present invention, with the improved furrow wheel and its support, together with the plow raising means, attached to the plow beam, the several parts being in the positions they assume when the plow is in working position;

Figure 2 is a side elevational view of the plow shown in Figure 1, with the several parts in the positions they assume when the plow is in working position;

Figure 3 is a side elevational view illustrating the several parts in the positions they assume when the plow is in transport or inoperative position;

Figure 4 is a rear elevational view of the plow shown in Figure 1, with the furrow wheel shown in vertical section to illustrate the mounting of the wheel upon its axle;

Figure 5 is a sectional view taken on the plane of the line 5—5 of Figure 2 and illustrating the means for locking the furrow wheel support against pivotal movement on its supporting member; and Figure 6 is a view, partly in section and partly in elevation, illustrating the means for detachably securing the furrow wheel axle to the furrow wheel support.

Referring to the drawing, the rear furrow wheel is indicated as an entirety by the reference numeral 11, and is journaled upon an axle 12 which is supported in a wheel support or member 13 in a manner to be more particularly described hereafter. The wheel support 13 preferably takes the form of a suitable casting or the like and is journaled in any suitable manner on a member 14. In the construction illustrated the lower end of the member 14 extends through a suitable bore provided in the casting 13 and is held in place by a cotter pin 14a or in any other manner preferred. The upper end of the member 14 is provided with a laterally bent portion 15 journaled in bearing openings provided in spaced brackets 16 and 17 fixed to and extending rearwardly from the rear end of the plow beam 18. As will be readily understood by those skilled in the art, the plow beam carries the usual plow body or bodies (not shown).

The plow is raised and lowered relative to the rear furrow wheel 11 by means of a suitable lifting mechanism comprising a lever 21 pivotally supported intermediate its ends on the member 14, as shown at 22. The lower end of the lever 21 is pivotally connected to the bracket 16 by means of an adjustable link 23 one end of which extends through the eye of an eye bolt 24 carried at the lower end of the lever 21. The portion of the link 23 that extends through the eye bolt 24 is provided with screw threads, and nuts 25 are threaded on said link and disposed on opposite sides of the eye bolt 24. This connection also provides for adjusting the vertical position of the furrow wheel 11 with respect to the bottom of the plow bodies, as will be described later.

In plows of the type described above, the rear furrow wheel is usually a wheel which casters when the plow bottoms are raised to transport position, thereby facilitating turning the plow at the end of the furrow, but when the plow bottoms are in lowered position it is necessary to hold the rear furrow wheel against castering. Figure 2 illustrates the position of the several parts when the plow is in working position. As there shown, the wheel support 13 is held against castering movement with respect to the member 14 by means of a locking mechanism which comprises an arm or lug 30 carried by and extending downwardly from the lower end of the lever 21 and engaging in a recess 31 (see Figure 5) provided in a suitably shaped bracket 32 formed integral rigidly with or otherwise supported from the wheel support 13. As long as the arm 30 is held in the notch 31, the wheel 11 is prevented from swinging about the axis of the lower portion of the supporting member 14.

Figure 3 illustrates the position of the various parts when the plow is raised to transport position. In this position, the arm 30 is disengaged from the recess 31 and allows the wheel support 13 to rotate on the member 14 whereby the furrow wheel 11 will have castering movement. It will be noted, however, that such castering movement is limited to a certain range by the arms or portions 32a of the bracket 32 which form stops which abut against the arm 30 of the lever 21 when the wheel 11 casters to a certain predetermined point in either direction from its normal straightforward position. In this connection also it should be pointed out that the portion of the bracket 32 joining the arms 32a is so shaped as to guide the lug 30 into the recess 31 from any position in which the wheel support 13 might be at the time the plow is dropped from transport position to working position.

Power for raising the plow from its working position as shown in Figure 2 to its transport position as shown in Figure 3 is supplied through a tension rod 35 pivotally connected at its rear end to the upper end of the lever 21 and having its forward end connected with an arm on the main crank axle of the plow (not shown). As will be readily understood, the rod 35 is pulled forwardly when the plow is raised, as is common in power lift plows, and it is therefore not believed that further showing or description of these parts is necessary.

As best shown in Figure 4, the axle 12 of the furrow wheel 11 comprises a downwardly and furrowwardly bent portion 40 upon which the wheel 11 is journaled, and an upwardly extending portion 41 (best shown in Figure 6) which is detachably connected to the wheel support or casting member 13 in a socket or bore 42 provided therein. As shown in Figure 6, the upwardly extending portion 41 of the axle is provided adjacent its upper end with a tapered portion 43 of square cross-section which fits in a similarly shaped opening in the socket 42, and the upper end of the portion 41 is provided with screw threads and extends through an opening provided therefor in the upper wall of the socket 42. A nut 45 is threaded thereon for fixing the axle section 41 rigidly in the socket 42. By this means the axle 12 is a rather small inexpensive part of the mechanism and may be readily replaced, as may be necessary owing to wear, breakage or the like.

As best shown in Figure 4, the wheel 11 is provided with a suitable hub 48 to be hereinafter described which is journaled on a bearing sleeve 50 which embraces the member 40 of the axle 12 and is held in position thereon by means of a pin 51 extending through alined openings in the member 40 and the sleeve 50. This bearing sleeve will take the wear in the turning of the wheel on the axle, and as it is a comparatively small and inexpensive part it may be readily replaced when necessary at small cost. The sleeve 50 is provided intermediate its ends, as shown, with an outwardly extending radial flange 52 formed integral therewith.

The hub 48 of the wheel 11 comprises two hub elements 53 and 54 having cylindrical portions journaled on the sleeve 50 on opposite sides of the flange 52. The element 54 is cup-shaped and provided with an enlarged portion 55 at its open end which embraces a part of the flange 52 and has a rim portion 56 extending radially therefrom and cooperates with a lateral flange 56a on the wheel web 58 in maintaining these parts in accurate alignment. The element 53 of the hub is also provided with a rim 57 which extends radially outwardly from the main body portion thereof adjacent the flange 52. The inner edge of the web portion 58 of the wheel 11 encircles that part of the flange 52 between the two rims 56 and 57 and is clamped between said rims by a plurality of bolts 59 which extend through aligned openings provided therefor in the rims 56 and 57 and the web 58. Thrust washers are provided for taking the wear between the flange 52 and the rims 56 and 57.

It will be seen that by the foregoing construction the lateral thrust of the sleeve 50 upon the hub of the wheel, occurring by reason of the downward inclination of the member 40 of the axle, is resisted by the flange 52 bearing against the end of the sleeve 54. The flange 52 also serves the purpose of preventing the wheel from falling off of the axle member 40 when, for example, the plow bottoms strike a hard spot or an obstruction, causing the rear end of the plow to be lifted. In the present construction also all the wear occurs between the hub elements 53 and 54 and the sleeve 50 which are all made as castings the wearing surfaces of which are chilled to give them long life. It will be noted, furthermore, that all of the parts entering into the axle and hub construction of the wheel are relatively small and inexpensive to manufacture, and hence they can be readily replaced at small expense when worn or broken. As shown, the cup-shaped hub element 54 encloses the furrowward end of the axle section 40 and the wear sleeve 50, thereby preventing the entry of dirt and the like to the several parts, and a cap member 53a encloses the opposite end of the sleeve 50 and the adjacent end of the hub element 53 to prevent the entry of dirt to the several parts at this end of the axle section 40.

With rear furrow wheel constructions now in common use it has been found that the wheel supporting member runs so close to the furrow wall when in operation that when the plow is used for relatively deep plowing the furrow wall is destroyed by such wheel supporting member contacting with and scraping against the wall, with the result that not only has unnecessary draft been added to the load but also uneven plowing has occurred as a result thereof. When the wheel support is so positioned with respect to the furrow wall that it destroys the upper edge of the wall, the soil falling down into the bottom of the furrow gives the furrow wheel following behind an uneven surface upon which to ride and as a result causes the plow to be lifted occasionally in riding over clods. This, of course, is objectionable, and in order to overcome this objection applicant has in his present construction, as clearly shown in Figure 4, dished the web 58 of the wheel furrowwardly sufficiently to dispose the furrow wall engaging portion 60 landwardly beyond the landward side of the wheel support 13 to cause the wheel support to clear the furrow wall a sufficient distance so that even when plowing relatively deep the wheel support will not strike the top portion of the furrow wall and break it down.

I claim:

1. The combination with a plow, of a rear furrow wheel supporting structure therefor comprising a member having a generally downwardly disposed end and pivoted to the plow at its upper end, means for moving said member to raise said plow from operating position to transport position, a wheel support journaled on the downwardly disposed end of said member and including a downwardly and furrowwardly inclined axle detachably connected to said wheel support and a rear furrow wheel jounaled on said axle.

2. The combination with a plow, of a rear furrow wheel supporting structure therefor comprising a member movably connected with the plow, means for moving said member to raise said plow from operating position to transport position, a wheel support journaled on said member for pivotal movement, means for locking said support against pivotal movement in any direction when said plow is in operating position and for unlocking said support for pivotal movement in both directions when the plow is in raised position, said wheel support including a downwardly and furrowwardly inclined axle and a rear furrow wheel journaled on said axle, said wheel having its ground engaging portion extending landwardly beyond the landward side of said wheel support whereby said wheel support clears the furrow wall.

3. The combination with a plow, of a rear furrow wheel supporting structure therefor comprising a member connected to the plow for vertical swinging movement, means for swinging said member to raise said plow from operating position to transport position, a wheel support journaled on said member for pivotal movement about an axis disposed substantially vertical when said plow is in a raised position, means for locking said support against pivotal movement when said plow is in operating position, said wheel support including a downwardly and furrowwardly inclined axle, and a rear furrow wheel journaled on said axle, said wheel having its ground engaging portion extending landwardly beyond the landward side of said wheel support whereby said wheel support clears the furrow wall.

4. The combination with a plow, of a rear furrow wheel supporting structure therefor comprising a member connected to the plow for vertical swinging movement, means for swinging said member to raise said plow from operating position to transport position, a wheel support journaled on said member for pivotal movement about an axis disposed substantially vertical when said plow is in a raised position, means for locking said support against pivotal movement when said plow is in operating position, said wheel support including a downwardly and furrowwardly inclined axle, and a rear furrow wheel journaled on said axle, said wheel comprising a ground engaging portion and a hub portion connected by a web portion, said web portion being dished furrowwardly sufficiently to dispose said ground engaging portion landwardly beyond the landward side of said wheel support whereby said wheel support clears the furrow wall.

5. The combination with a plow, of a rear furrow wheel structure therefor comprising a member connected to the plow for vertical swinging movement, means for swinging said member to raise said plow from operating position to transport position, said member having a spindle disposed substantially vertical when said plow is in a raised position, a wheel support including a bearing journaled on said spindle, means for locking said support against movement on said spindle when said plow is in operating position, an axle having a portion detachably connected to said wheel support and having a downwardly and furrowwardly inclined portion, and a rear furrow wheel journaled on said inclined portion.

6. The combination with a plow, of a rear furrow wheel structure therefor comprising a member connected to the plow for vertical swinging movement, means for swinging said member to raise said plow from operating position to transport position, said member having a spindle disposed substantially vertical when said plow is in a raised position, a wheel support including a bearing journaled on said spindle, means for locking said support against movement on said spindle when said plow is in operating position, said support having a socket, an axle having a portion detachably connected in said socket and having a downwardly and furrowwardly inclined portion, and a rear furrow wheel journaled on said inclined portion.

7. In a rear furrow wheel structure the combination of a wheel support including a downwardly and furrowwardly inclined axle, a cast sleeve removably fixed to said axle, said sleeve having a radially extending circumferential flange formed integral therewith, and a furrow wheel having a hub journaled upon said sleeve, said hub consisting of two members, one member comprising a cylindrical portion and a radially extending circumferential rim formed integral therewith, said cylindrical portion being journaled upon said sleeve on one side of said flange and said rim being removably fixed to said wheel, the other member comprising a cylindrical portion journaled upon said sleeve on the other side of said flange and having an enlarged portion at one end embracing said flange, said enlarged portion having a radially extending circumferential rim formed integral therewith and removably fixed to said wheel.

8. In a rear furrow wheel structure the combination of a wheel support including a downwardly and furrowwardly inclined axle, a cast sleeve removably fixed to said axle, said sleeve having a radially extending circumferential flange formed integral therewith, and a furrow wheel having a web portion encircling said flange and a hub journaled upon said sleeve, said hub consisting of two members positioned on opposite sides of said web portion, each of said members comprising a cylindrical portion journaled upon said sleeve and a radially outwardly extending circumferential rim formed integral therewith and bearing laterally against said flanges, and means for detachably connecting said circumferential rims to the web of the wheel.

9. In a rear furrow wheel structure the combination of a wheel support including a downwardly and furrowwardly inclined axle, a cast sleeve removably fixed to said axle, said sleeve having a radially extending circumferential flange formed integral therewith, and a furrow wheel having a web portion encircling said flange and a hub journaled upon said sleeve, said hub consisting of two members positioned on opposite sides of said web portion, each of said members comprising a cylindrical portion journaled upon said sleeve and a radially outwardly extending circumferential rim formed integral therewith and bearing laterally against said flange, said rims extending radially beyond the flange on opposite sides of the web portion of said furrow wheel, said web portion having a lateral flange cooperating with the rim of one of said hub members to hold the parts in alignment, and means for detachably connecting said circumferential rims to the web of the wheel.

10. The combination with a plow, of a rear furrow wheel structure therefor comprising a member connected to the plow for vertical swinging about a transverse axis, a lever pivotally connected with the plow and reacting against said member, means for rocking said lever to swing said member to raise the plow from operating position to transport position, a wheel support journaled on said member for pivotal movement about an axis disposed substantially vertical when the plow is in a raised position, and means including an arm on said lever and a bracket so positioned on said support as to be engaged by said arm when said plow is in operating position for locking said support against pivotal movement.

11. The combination with a plow and means for raising and lowering the same, of a rear furrow wheel supporting structure therefor comprising a member connected to the plow for vertical swinging movement, a second member journaled on said first member for pivotal movement, an axle carried by said second member, a rear furrow wheel journaled on said axle, a bracket carried by said second member and cooperating with an arm carried by said raising and lowering means and operative to lock said second member against pivotal movement when the plow is in operating position and to release said second member for pivotal movement when the plow is in raised position.

12. The combination with a plow and means for raising and lowering the same, of a rear furrow wheel supporting structure therefor comprising a member connected to the plow for vertical swinging movement, a second member journaled on said first member for pivotal movement, an axle carried by said second member, a rear furrow wheel journaled on said axle, said second member being capable of pivoting on said first member when the plow is in raised position, a bracket carried by said second member and having a recess therein, an arm carried by said raising and lowering means and adapted to seat in said recess to lock said second member against pivotal movement when the plow is in operating position, and means carried by said bracket for guiding said arm into said recess from any position in which it may be when the plow is dropped from raised to lowered position.

13. The combination with a plow, of a rear furrow wheel structure therefor comprising a member connected to the plow for vertical swinging about a transverse axis, a lever pivoted to said member, a link pivotally connected at its ends to said lever and to the plow, means for rocking said lever to swing said member to raise the plow from operating position to transport position, a wheel support journaled on said member for pivotal movement about an axis disposed substantially vertical when the plow is in a raised position, and means including an arm on said lever and a bracket on said support positioned to be engaged by said arm when said plow is in operating position for locking said support against pivotal movement.

14. A rear furrow wheel structure for plows comprising a vertically movable supporting member, a wheel support journaled on said member for lateral swinging movement, an axle having a portion detachably connected to said wheel support and having a downwardly and furrowwardly inclined portion, a rear furrow wheel journaled on said inclined portion, means carried by said supporting member for swinging the same vertically, and means actuated by said last named means for controlling the lateral swinging of said wheel support.

15. A rear furrow wheel structure for plows comprising a supporting member, a wheel support journaled on said member for lateral swinging movement, said support having a socket, an axle having a portion detachably connected in said socket and having a downwardly and furrowwardly inclined portion, and a rear furrow wheel journaled on said inclined portion.

16. The combination with a plow adapted for movement into and out of operative position, of a rear furrow wheel structure therefor comprising a supporting member having a spindle, a wheel support journaled on said spindle for lateral swinging movement, means for locking said wheel support against movement on said spindle when said plow is in operating position, an axle having a portion detachably connected to said wheel support and having a downwardly and laterally inclined portion, and a rear furrow wheel journaled on said inclined portion.

17. The combination with a plow adapted for movement into and out of operative position, of a rear furrow wheel structure therefor comprising a supporting member having a spindle, a wheel support including a bearing journaled on said spindle for lateral swinging movement, means for locking said wheel support against movement on said spindle when said plow is in operating position, said support having a socket rearwardly of said bearing, an axle having a portion detachably connected in said socket and having a downwardly and laterally inclined portion, and a rear furrow wheel journaled on said inclined portion.

18. In a wheel structure for plows and the like, the combination of a wheel support including an axle, a cylindrical sleeve removably fixed to said axle, said sleeve having a radially extending circumferential flange formed integral therewith, and a wheel having a hub journaled upon said sleeve, said hub consisting of two members, each member comprising a cylindrical portion and a radially extending circumferential rim, the cylindrical portion of one member being journaled upon said sleeve on one side of said flange and the cylindrical portion of the other member being journaled upon said sleeve on the opposite side of said flange, and means connecting said members to said wheel.

19. In a wheel structure for plows and the like, the combination of a wheel support including an axle, a cast sleeve removably fixed to said axle, said sleeve having a radially extending circumferential flange formed integral therewith, and a wheel having a web portion encircling said flange and a hub journaled upon said sleeve, said hub consisting of two members positioned on opposite sides of said web portion, each of said members comprising a cylindrical portion journaled upon said sleeve and a radially outwardly extending circumferential rim formed integral therewith and bearing laterally against said flange, and means for detachably connecting said circumferential rims to the web of the wheel.

20. In a wheel structure for plows and the like, the combination of a wheel support including an axle, a cast sleeve removably fixed to said axle, said sleeve having a radially extending circumferential flange formed integral therewith, and a wheel having a hub journaled upon said sleeve, said hub consisting of two members, one member comprising a cylindrical portion and a radially extending circumferential rim formed integral therewith, said cylindrical portion being journaled upon said sleeve on one side of said flange and said rim being removably fixed to said wheel, the other member comprising a cylindrical portion journaled upon said sleeve on the other side of said flange and having an enlarged portion at one end embracing said flange, said enlarged portion having a radially extending circumferential rim formed integral therewith and removably fixed to said wheel.

21. In a wheel structure for plows and the like, the combination of a wheel support including a downwardly and laterally inclined axle, a sleeve removably fixed to said axle, said sleeve having cylindrical portions separated by a radially extending circumferential flange, and a wheel having a hub journaled upon said sleeve, said hub consisting of two cylindrical members disposed on the cylindrical portions of said sleeve and positioned on opposite sides of and in contact with said circumferential flange, and means for securing said members to the web of said wheel, lateral thrusts on said wheel being transmitted by said members to said flange.

22. In a plow, a rear furrow wheel supporting structure comprising a member connected to the plow for vertical swinging movement, a second member journaled on said first member for pivotal movement, an axle carried by said second member, a rear furrow wheel journaled on said axle, a bracket carried by said second member, means for raising and lowering said members including a part reacting against said first member, and means on said part cooperating with said bracket and operative to lock said second member against pivotal movement when the plow is in operating position and to release said second member for pivotal movement when the plow is in raised position.

23. In a plow, a rear furrow wheel supporting structure comprising a member having a laterally bent upper end, an intermediate portion and a downwardly bent lower end, means pivotally connecting said laterally bent end with the plow whereby said member has vertical swinging movement with respect thereto, a second member journaled on the lower end of said first member for lateral swinging movement, an axle carried by said second member, a rear furrow wheel journaled on said axle, means for raising and lowering the plow including a third member reacting against the intermediate portion of said first member, a bracket carried on one of said second and third members, and means on the other of said second and third members cooperating with said bracket for locking said second member against pivotal movement when the plow is in operating position and to release said second member for pivotal movement when the plow is in raised position.

24. In a plow, a rear furrow wheel supporting structure comprising a member connected to the plow for vertical swinging movement, a second member journaled on said first member for pivotal movement, an axle carried by said second member, a rear furrow wheel journaled on said axle, a bracket carried by said second member, means for raising and lowering said members including a lever pivotally mounted on said first member and connected with the plow at one end, and means on said lever cooperating with said bracket and operative to lock said second member against pivotal movement when the plow is in operating position and to release said second member for pivotal movement when the plow is in raised position.

25. In a plow, a rear furrow wheel supporting structure comprising a member connected to the plow for vertical swinging movement, a second member journaled on said first member for pivotal movement, an axle carried by said second member, a rear furrow wheel journaled on said axle, a bracket carried by said second member, and means for raising and lowering said members including a lever pivotally mounted on said first member and connected with the plow at its lower end, said bracket cooperating with said lower end of the lever and operative to lock said second member against pivotal movement when the plow is in operating position and to release said second member for pivotal movement when the plow is in raised position.

CARL G. STRANDLUND.